(12) United States Patent
Li et al.

(10) Patent No.: US 12,054,652 B2
(45) Date of Patent: Aug. 6, 2024

(54) TWO-COMPONENT SOLVENT-LESS ADHESIVE COMPOSITION

(71) Applicants: Dow Global Technologies LLC, Midland, MI (US); Rohm and Haas Company, Collegeville, PA (US)

(72) Inventors: Tuoqi Li, Lake Jackson, TX (US); Joseph J. Zupancic, Glen Ellyn, IL (US); Matthew M. Yonkey, Midland, MI (US); Paul G. Clark, Midland, MI (US); Thorsten Schmidt, Horgen (CH); Ken Kawamoto, Midland, MI (US); Wenwen Li, Pearland, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 462 days.

(21) Appl. No.: 17/436,434

(22) PCT Filed: Mar. 4, 2020

(86) PCT No.: PCT/US2020/020921
§ 371 (c)(1),
(2) Date: Sep. 3, 2021

(87) PCT Pub. No.: WO2020/180948
PCT Pub. Date: Sep. 10, 2020

(65) Prior Publication Data
US 2022/0169901 A1    Jun. 2, 2022

Related U.S. Application Data

(60) Provisional application No. 62/813,830, filed on Mar. 5, 2019.

(51) Int. Cl.
| | | |
|---|---|---|
| *C08G 18/46* | (2006.01) | |
| *B32B 7/12* | (2006.01) | |
| *B32B 15/085* | (2006.01) | |
| *B32B 27/08* | (2006.01) | |
| *B32B 27/32* | (2006.01) | |
| *B32B 27/36* | (2006.01) | |
| *C08G 18/12* | (2006.01) | |
| *C08G 18/38* | (2006.01) | |
| *C09J 175/06* | (2006.01) | |
| *C09J 175/12* | (2006.01) | |

(52) U.S. Cl.
CPC ............... *C09J 175/06* (2013.01); *B32B 7/12* (2013.01); *B32B 15/085* (2013.01); *B32B 27/08* (2013.01); *B32B 27/32* (2013.01); *B32B 27/36* (2013.01); *C08G 18/12* (2013.01); *C08G 18/3885* (2013.01); *C08G 18/4615* (2013.01)

(58) Field of Classification Search
CPC .......................... C08G 18/4615; C09J 175/12
See application file for complete search history.

(56) References Cited

U.S. PATENT DOCUMENTS

| | | | |
|---|---|---|---|
| 4,734,303 A | | 3/1988 | Fujiwara et al. |
| 4,954,199 A | * | 9/1990 | Rains ................. C08G 18/6529 |
| | | | 156/331.7 |
| 5,144,824 A | | 9/1992 | Kobayashi et al. |
| 5,290,905 A | | 3/1994 | Komiya et al. |
| 5,360,649 A | | 11/1994 | Sato et al. |
| 5,731,389 A | | 3/1998 | Bailly et al. |
| 6,011,125 A | | 1/2000 | Lohmeijer et al. |
| 6,238,783 B1 | | 5/2001 | Komai et al. |
| 6,348,121 B1 | | 2/2002 | Schoener et al. |
| 7,641,968 B2 | | 1/2010 | Kanagawa et al. |
| 8,389,647 B2 | | 3/2013 | Paschkowski |
| 2003/0055197 A1 | * | 3/2003 | Morikawa ............ C08G 18/718 |
| | | | 528/44 |
| 2008/0090956 A1 | | 4/2008 | Munzmay et al. |
| 2010/0136347 A1 | | 6/2010 | Simons et al. |
| 2010/0249360 A1 | | 9/2010 | Imai et al. |
| 2011/0014479 A1 | | 1/2011 | Song et al. |
| 2012/0180952 A1 | | 7/2012 | Imai et al. |
| 2015/0018512 A1 | | 1/2015 | Heath et al. |
| 2015/0031815 A1 | | 1/2015 | Singh et al. |
| 2016/0009953 A1 | * | 1/2016 | Erdodi ............... C08G 18/0823 |
| | | | 524/514 |
| 2016/0264724 A1 | | 9/2016 | Zupancic et al. |
| 2017/0226391 A1 | | 8/2017 | Vietti et al. |
| 2018/0186919 A1 | | 7/2018 | Zupancic et al. |

FOREIGN PATENT DOCUMENTS

| | | | |
|---|---|---|---|
| CN | 1504490 A | 6/2004 | |
| CN | 106795411 A | 5/2017 | |
| CN | 108884207 A | 11/2018 | |
| EP | 302712 A * | 2/1989 | ............. C08G 18/44 |
| KR | 100694981 B1 | 3/2007 | |

OTHER PUBLICATIONS

CN202080026606.6 English Translation of Search Report for Office Action 1, Dated Jul. 25, 2023.
CN202080026606.6 English Translation of Office Action 1, Dated Jul. 25, 2023.

* cited by examiner

*Primary Examiner* — Michael L Leonard
(74) *Attorney, Agent, or Firm* — Boyle Fredrickson, S.C.

(57) ABSTRACT

The present disclosure provides a two-component solvent-less adhesive composition. The two-component solvent-less adhesive composition contains the reaction product of (A) an isocyanate component and (B) a polyol component containing a poly-ester-amide polycarbonate polyol. The present disclosure also provides a method of forming a two-component solvent-less adhesive composition.

12 Claims, No Drawings

TWO-COMPONENT SOLVENT-LESS ADHESIVE COMPOSITION

BACKGROUND

Laminates formed with solvent-less adhesives oftentimes exhibit poor adhesion after chemical aging and/or after high temperature testing such as a boil-in-bag test. Such laminates are unsuitable for laminate applications, such as food packaging and deep-drawn cans, which require sufficient adhesion for a period of time after exposure to heat and/or chemicals. Insufficient adhesion results in defects in the laminate structure, such as bubbling and delamination.

The art recognizes the need for a solvent-less adhesive that exhibits sufficient adhesion between substrates after exposure to heat and/or chemicals. Further recognized in the art is the need for adhesive compositions that maintain adhesion in a laminate structure that is exposed to chemical aging, high temperature, and/or bag-in-boil testing.

SUMMARY

The present disclosure provides a two-component solvent-less adhesive composition. The two-component solvent-less adhesive composition contains the reaction product of (A) an isocyanate component and (B) a polyol component containing a polyester-amide polycarbonate polyol.

The present disclosure also provides a method of forming a two-component solvent-less adhesive composition. The method includes the steps of (A) providing a polyol component containing a polyester-amide polycarbonate polyol; (B) providing an isocyanate component; and (C) reacting the polyol component with the isocyanate component to form the two-component solvent-less adhesive composition.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" refers to an organic radical derived from an aliphatic hydrocarbon by deleting one hydrogen atom therefrom. An alkyl group can be linear, branched, cyclic, or a combination thereof.

"Aryl" refers to an aromatic substituent which may be a single aromatic ring or multiple aromatic rings which are fused together, linked covalently, or linked to a common group such as a methylene or ethylene moiety.

An "amide" is a compound containing an N—C=O moiety in its structure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "dicarboxylic acid" is a compound containing two carboxyl (—COOH) groups.

An "ether group" is a moiety containing an oxygen atom bonded to two alkyl or aryl groups. "Substituted ether group," refers to an ether in which one or more hydrogen atom bound to any carbon of the alkyl or aryl is replaced by another group such as a phosphate, a hydroxy, and combinations thereof.

A "hydrocarbon" is a compound that contains only hydrogen and carbon atoms. The hydrocarbon can be (i) branched or unbranched, (ii) saturated or unsaturated, (iii) cyclic or acyclic, and (iv) any combination of (i)-(iii). Nonlimiting examples of hydrocarbons include alkyls, aryls, alkanes, alkenes, and alkynes.

An "isocyanate" is a compound that contains at least one isocyanate group in its structure. An isocyanate group is represented by the formula: —N=C=O. A "polyisocyanate" (or "multifunctional isocyanate") is an isocyanate containing more than one, or at least two, isocyanate groups. A polyisocyanate having two isocyanate groups is a diisocyanate and an isocyanate having three isocyanate groups is a triisocyanate, etc. Isocyanates include aromatic isocyanates, aromatic polyisocyanates, aliphatic isocyanates and aliphatic polyisocyanates.

A "polycarbonate" is a compound containing two or more carbonate groups in the same liner chain of atoms.

A "polyester" is a compound containing two or more ester linkages in the same linear chain of atoms.

A "polyester polyol" is a compound that is a polyester and a polyol. Nonlimiting examples of suitable polyester polyols include polycondensates of diols, polyols (e.g., triols, tetraols), dicarboxylic acids, polycarboxylic acids (e.g., tricarboxylic acids, tetracarboxylic acids), hydroxycarboxylic acids, lactones, and combinations thereof. The polyester polyols can also be derived from, instead of the free polycarboxylic acids, the corresponding polycarboxylic anhydrides, or corresponding polycarboxylic esters of lower alcohols.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "polyol" is an organic compound containing multiple hydroxyl (—OH) groups. In other words, a polyol contains at least two —OH groups. Nonlimiting examples suitable polyols include diols (which contain two —OH groups) and triols (which contain three —OH groups).

A "solvent-less adhesive" is an adhesive composition that is void of, or substantially void of, a solvent.

TEST METHODS

Acid value (or acid number) is measured in accordance with ASTM D 1386/7. Acid value is a measure of the amount of carboxylic acid present in a component or a composition. The acid value is the number of milligrams of potassium hydroxide required for the neutralization of free carboxylic acids present in one gram of a substance (e.g., a polyol). Units for acid value are mg KOH/g.

Glass transition temperature (Tg) is determined from the Differential Scanning calorimetry (DSC) heating curve where half the sample has gained the liquid heat capacity, as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg. The glass transition temperature is in degrees Celsius (° C.).

Hydroxyl number (or OH Number) is a measure of the number of hydroxyl groups present in a component or a composition. The OH Number is the number of milligrams of potassium hydroxide required to neutralize the hydroxyl groups in one gram of a substance (mg KOH/g). The OH Number is determined in accordance with DIN 53240.

Viscosity is measured at 25° C. and 40° C. in accordance with ASTM D2196. Viscosity is reported in mPa·s.

Gel Permeation Chromatography (GPC)

Weight average molecular weight (Mw) and number average molecular weight (Mn) are measured using a gel permeation chromatography (GPC) system.

The "Z average molecular weight" (Mz) is the third moment average molar mass. Mz is measured using a gel permeation chromatography (GPC) system.

Mw, Mn, and Mz are calculated according to the following Equations (1)-(3):

$$\overline{Mn} = \frac{\sum_i Wf_i}{\sum_i (Wf_i / M_i)} \quad \text{Equation (1)}$$

$$\overline{Mw} = \frac{\sum_i (Wf_i * M_i)}{\sum_i Wf_i} \quad \text{Equation (2)}$$

$$\overline{Mz} = \frac{\sum_i (Wf_i * M_i^2)}{\sum_i (Wf_i * M_i)} \quad \text{Equation (3)}$$

wherein Wfi is the weight fraction of the i-th component and Mi is the molecular weight of the i-th component. Polydispersity is calculated in accordance with the following Equation (4):

$$PDI = \overline{M_w} / \overline{M_n} \quad \text{Equation (4)}$$

The content of species having a Mw less than 500 g/mol, and a Mw less than 1000 g/mol for a polyol is measured using the "GPC One" software from PolymerChar Inc. using the following Equation (5):

$$f = \sum^j Wf_j / \sum^j Wf_i \quad \text{Equation (5)}$$

wherein $Wf_j$ is the weight fraction of the j-th component with a molecular weight lower than 500 g/mol or 1,000 g/mol, respectively.

Bond Strength (90° T-Peel Test)

Bond strength is measured in accordance with the 90° hand-assisted T-Peel Test. The laminate is cut into 2.54 cm wide strips after curing in an oven at 50° C. for two days for the initial T-peel bond strength test. A Thwing Albert™ QC-3A peel tester equipped with a 50 N loading cell is operated a rate of 10 inch/min. During testing, the tail of the strip is pulled slightly by finger to make sure the tail remains oriented at 90° to the peeling direction. The average bond strength (Newtons per 2.54 centimeter (N/2.54 cm)) is determined from the force versus distance profile. Three samples are tested and the average "bond strength" reported.

Bond strength is measured at one, two, four, seven, or fourteen days after the formation of the laminate. Bond strength is also measured after chemical aging and the boil-in-bag test.

Pouch Preparation for Boil-in-Bag and Chemical Aging

Laminates of 23 cm×30.5 cm are folded onto themselves to provide a structure that is 23 cm×15.3 cm, the structure having a first side and a second side. The first side and the second side each is formed from the same laminate. The second substrate (LDPE film or cast polypropylene film) of the first side is in contact with the second substrate (LDPE film or cast polypropylene film) of the second side. The structure has four edges, including a fold edge and three open edges. The edges are trimmed on a paper cutter to give a folded structure that is 12.7 cm×17.8 cm. Two of the open edges are heat sealed to form a pouch. Heat sealing occurs at 177° C. for 1 second at a hydraulic pressure of 276 kPa. Four to six pouches are made from each example.

Each pouch is filled through the remaining open edge with 100 mL of a sauce (1:1:1 by weight mixture of ketchup, vinegar, and vegetable oil). Splashing the sauce onto a heat seal area is avoided to prevent heat seal failure. After filling, the open edge is heat sealed in a manner that minimizes air entrapment inside of the closed pouch. Each closed pouch has four closed edges and an interior void that is 10.2 cm×15.2 cm (which is filled with sauce). The integrity of each heat seal is visually inspected to ensure there are no flaws in the sealing that would cause the pouch to leak during testing. Pouches with suspected flaws are discarded and replaced.

Boil-in-Bag. A pot is filled ⅔ full with water, and brought to a rolling boil. The boiling pot is covered with a lid to minimize water and steam loss. Two to three pouches of each sample are individually placed in the boiling water, and kept in the boiling water for 30 minutes. The pouches are then removed from the boiling water and visually inspected for tunneling, bubbling, blistering, delamination, and/or leakage. The pouches are cut open, emptied of sauce, and rinsed with soap and water. One or more strips (2.45 cm wide) of laminate are cut from the pouches (excluding heat seal areas). Bond strength of the laminate is measured in accordance with the 90° T-Peel Test described above. Bond strength is measured as soon as possible after the pouches are emptied of sauce. The interior of the pouches are visually inspected for defects.

Chemical Aging. Two to three pouches filled with sauce of each sample are placed in a convection oven at a temperature of 60° C. for a period of 100 hours. The pouches are then removed from the oven, cooled to room temperature, and visually inspected for tunneling, bubbling, blistering, delamination, and/or leakage. The pouches are cut open, emptied of sauce, and rinsed with water. One or more strips (2.54 cm wide) of laminate are cut from the pouches (excluding heat seal areas). Bond strength of the laminate is measured in accordance with the 90° T-Peel Test as described above. Bond strength is measured as soon as possible after the pouches are emptied of sauce. The interior of the pouches are visually inspected for defects.

DETAILED DESCRIPTION

The present disclosure provides a two-component solvent-less adhesive composition. The two-component solvent-less adhesive composition contains the reaction product of (A) an isocyanate component; and (B) a polyol component containing a polyester-amide polycarbonate polyol.

A. Isocyanate Component

The two-component solvent-less adhesive composition contains the reaction product of (A) an isocyanate component (NCO Component); and (B) a polyol component.

Nonlimiting examples of suitable NCO Components include aromatic isocyanates, aliphatic isocyanates, carbodiimide modified isocyanates, polyisocyanate trimers, polyfunctional isocyanate, isocyanate prepolymers, and the combinations thereof.

An "aromatic isocyanate" (or "aromatic polyisocyanate") is an isocyanate containing one or more aromatic rings. Nonlimiting examples of suitable aromatic isocyanates include isomers of methylene diphenyl dipolyisocyanate (MDI); modified MDI such as carbodiimide modified MDI or allophanate modified MDI; isomers of toluene-dipolyisocyanate (TDI); isomers of naphthalene-dipolyisocyanate (NDI); isomers of phenylene dipolyisocyanate (PDI); and combinations thereof.

An "aliphatic isocyanate" (or "aliphatic polyisocyanate") is an isocyanate that is void of, or contains no, aromatic rings. Aliphatic isocyanates include cycloaliphatic isocyanate, in which the chemical chain is ring-structured. In an embodiment, the aliphatic isocyanate contains from 3, or 4, or 5, or 6 to 7, or 8, 10, 12, or 13, or 14, or 15, or 16 carbon atoms in the linear, branched, or cyclic alkylene residue. Nonlimiting examples of suitable aliphatic isocyanates include cyclohexane diisocyanate; methylcyclohexane diisocyanate; ethylcyclohexane diisocyanate; propylcyclohexane diisocyanate; methyldiethylcyclohexane diisocyanate; propane diisocyanate; butane diisocyanate; pentane diisocyanate; hexane diisocyanate; heptane diisocyanate; octane diisocyanate; nonane diisocyanate; nonane triisocyanate; decane di- and tri-isocyanate; undecane di- and tri-isocyanate; dodecane di- and tri-isocyanate; isophorone diisocyanate; hexamethylene diisocyanate; diisocyanatodicyclohexylmethane; 2-methylpentane diisocyanate; 2,2,4-trimethylhexamethylene diisocyanate; 2,4,4-trimethylhexamethylene diisocyanate; norbornane diisocyanate (NBDI); xylylene diisocyanate; isomers, dimers, and/or trimers thereof; and combinations thereof.

A "polyisocyanate trimer" is the reaction product prepared by trimerization of di-isocyanates in the presence of a catalyst. A nonlimiting example of a polyisocyanate trimer is 2,4-TDI trimer (said polyisocyanate trimer being available under CAS 26603-40-7).

In an embodiment, the isocyanate is a polyfunctional isocyanate. In another embodiment, the polyfunctional isocyanate is selected from a di-isocyanate, a tri-isocyanate, and combinations thereof. In a further embodiment, the polyfunctional isocyanate is a di-isocyanate.

An "isocyanate prepolymer" is the reaction product of a polyisocyanate and at least one polyol. The polyisocyanate bonds to a polyol in a chemical reaction to form the isocyanate prepolymer. Nonlimiting examples of suitable polyisocyanates include aromatic polyisocyanates, aliphatic polyisocyanates, carbodiimide modified polyisocyanates, and combinations thereof. Nonlimiting examples of suitable polyols used to form the isocyanate prepolymer include polyester polyols, polyether polyols, aliphatic polyols, and combinations thereof. In an embodiment, the isocyanate prepolymer is the reaction product of a polyisocyanate, a polyol, and an optional catalyst. Nonlimiting examples of suitable catalysts include dibutyltin dilaurate, zinc acetate, 2,2-dimorpholinodiethylether, and combinations thereof.

In an embodiment, the isocyanate is an aliphatic isocyanate prepolymer. A nonlimiting example of a suitable aliphatic isocyanate prepolymer is MOR-FREE™ C-33, available from The Dow Chemical Company.

The NCO Component may comprise two or more embodiments disclosed herein.

B. Polyol Component

The two-component solvent-less adhesive composition contains the reaction product of (A) the NCO Component and (B) a polyol component. The polyol component contains a polyester-amide polycarbonate polyol.

Polyester-Amide Polycarbonate Polyol

The polyol component contains a polyester-polycarbonate polyol.

A "polyester-amide polycarbonate polyol" (or "PE-A PC") is a compound that is a polyester, an amide, a polycarbonate, and a polyol. The PE-A PC can be prepared by reacting aliphatic and aromatic diacid monomer(s) (such as adipic acid (AA) and isophthalic acid), diol monomer(s) including aliphatic diol monomer and polyether diol monomer (such as ethylene glycol, 1,4-butanediol, 1,6-hexanediol (HDO), neopentyl glycol (NPG), and 1,2-propanediol (PDO)), a carbonate monomer or polycarbonate (such as poly(1,4-butanediol-carbonate (BDO-PC)), and an amide monomer (such as ethylenediamine (EDA), N,N'-dimethylethylenediamine (DMEDA), or ethanolamine).

In an embodiment, the PE-A PC is selected from (i) the reaction product of AA, PDO, NPG, HDO, BDO-PC, and EDA; (ii) the reaction product of AA, PDO, NPG, HDO, BDO-PC, and DMEDA; (iii) the reaction product of AA, isophthalic acid, PDO, NPG, HDO, BDO-PC, and EDA(iv) the reaction product of AA, isophthalic acid, PDO, NPG, HDO, BDO-PC, and DMEDA; (v) the reaction product of AA, PDO, NPG, HDO, BDO-PC, and ethanolamine; and (vi) combinations thereof.

In an embodiment, the PE-A PC has the Structure (A):

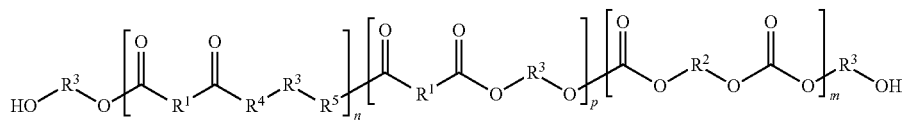

Structure (A)

wherein n is from 1, or 2 to 5; p is from 1, or 2 to 30; m is from 1, or 2 to 20;
$R^1$ is selected from —$(CH_2)_4$—,

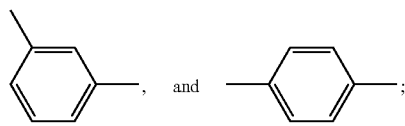, and 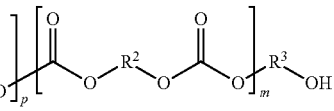;

$R^2$ is selected from —$(CH_2)_4$— and —$(CH_2)_6$—;
$R^3$ is selected from —$(CH_2)_2$—, —$(CH_2)_4$—, —$(CH_2)_6$—, —$(CH_2)_2$—O—$(CH_2)_2$—, —$CH_2$—$C(CH_3)_2$—, —$CH_2$—$CH(CH_3)$—$CH_2$—, and —$CH_2$—$C(CH_3)_2$—$CH_2$—;
$R^4$ is selected from O, NH, $NCH_3$, and $NCH_2CH_3$;
$R^5$ is selected from O, NH, $NCH_3$, and $NCH_2CH_3$; with the proviso that $R^4$ and $R^5$ are not both O.

In an embodiment, the PE-A PC has a number average molecular weight, Mn, from 500 g/mol, or 1000 g/mol to 1700 g/mol, or 2000 g/mol, or 3000 g/mol, or 5000 g/mol, or 8000 g/mol; or from 500 g/mol to 8000 g/mol, or from 1000 g/mol to 5000 g/mol, or from 1000 g/mol to 2000 g/mol.

In an embodiment, the PE-A PC has a weight average molecular weight, Mw, from 500 g/mol, or 2000 g/mol to 3500 g/mol, or 5000 g/mol; or from 500 g/mol to 5000 g/mol, or from 2000 g/mol to 3500 g/mol.

In an embodiment, the PE-A PC has a Mw/Mn from 1.5, or 1.6 to 1.9, or 2.2, or 2.5; or from 1.5 to 2.5, or from 1.6 to 1.2.

In an embodiment, the PE-A PC has an acid value from 0.01 mg KOH/g to 1.6 mg KOH/g, or 2.0 mg KOH/g; or from 0.01 mg KOH/g to 2.0 mg KOH/g, or 0.01 mg KOH/g to 1.6 mg KOH/g.

In an embodiment, the PE-A PC has an OH Number from 100 mg KOH/g to 150 mg KOH/g, or 200 mg KOH/g; or from 100 mg KOH/g to 200 mg KOH/g, or 100 mg KOH/g to 150 mg KOH/g.

In an embodiment, the PE-A PC has a glass transition temperature (Tg) from −90° C., or −80° C., or −75° C. to −65° C., or −60° C., or −55° C., or −50° C.; or from −90° C. to −50° C., or from −80° C. to −55° C.

In an embodiment, the PE-A PC has a viscosity at 25° C. from 500 mPa·s, or 1000 mPa·s to 3000 mPa·s, or 5000 mPa·s; or from 500 mPa·s to 5000 mPa·s, or from 900 mPa·s to 3000 mPa·s.

In an embodiment, the PE-A PC has a viscosity at 40° C. from 300 mPa·s, or 350 mPa·s to 2000 mPa·s, or 4000 mPa·s; or from 300 mPa·s to 4000 mPa·s, or from 350 mPa·s to 2000 mPa·s.

In an embodiment, the PE-A PC contains less than 55 wt %, or less than 50 wt %, or less than 40 wt %, or less than 30 wt %, or less than 20 wt %, or less than 15 wt %, or less than 10 wt %; or from 0 wt %, or 0.01 wt %, or 1 wt % to 10 wt %, or 15 wt %, or 20 wt %, or 30 wt %, or 40 wt %, or 50 wt %, or 55 wt %; or from 0 wt % to 10 wt % species having a Mw less than 500 g/mol, based on the total weight of the PE-A PC. In an embodiment, the PE-A PC contains less than 55 wt %, or less than 50 wt %, or less than 40 wt %, or less than 30 wt %, or less than 26 wt %; or from 0 wt %, or 0.01 wt %, or 1 wt % to 26 wt %, or 30 wt %, or 40 wt %, or 50 wt %, or 55 wt %; or from 0 wt % to 30 wt % species having a Mw less than 1000 g/mol, based on the total weight of the PE-A PC. Not wishing to be bound by any particular theory, it is believed that (i) a low level (i.e., less than 55 wt %) of species having a Mw less than 500 g/mol and/or (ii) a low level (i.e., less than 55 wt %) of species having a Mw less than 1000 g/mol in the PE-A-PC minimizes the amount of migration of low molecular weight species in cured laminating adhesives, which is advantageous in food packaging applications.

In an embodiment, the PE-A PC has one, some, or all of the following properties: (i) a Mn from 500 g/mol to 8000 g/mol, or from 1000 g/mol to 2000 g/mol; and/or (ii) a Mw from 500 g/mol to 5000 g/mol, or from 2000 g/mol to 3500 g/mol; and/or (iii) a Mw/Mn from 1.5 to 2.5, or from 1.6 to 1.2; and/or (iv) an acid value from 0.01 mg KOH/g to 2.0 mg KOH/g, or from 0.01 mg KOH/g to 1.6 mg KOH/g; and/or (v) an OH Number from 100 mg KOH/g to 200 mg KOH/g, or from 100 mg KOH/g to 150 mg KOH/g; and/or (vi) a Tg from −90° C. to −50° C., or from −80° C. to −55° C.; and/or (vii) a viscosity at 25° C. from 500 mPa·s to 5000 mPa·s, or from 900 mPa·s to 3000 mPa·s; and/or (viii) a viscosity at 40° C. from 300 mPa·s to 4000 mPa·s, or from 350 mPa·s to 2000 mPa·s; and/or (ix) from 0 wt % to 10 wt % species having a Mw less than 500 g/mol; and/or (x) from 0 wt % to 30 wt % species having a Mw less than 1000 g/mol, based on the total weight of the PE-A PC; and/or (xi) has the Structure (A); and/or (xii) is selected from the reaction product of (a) AA, PDO, NPG, HDO, BDO-PC, and EDA; (b) AA, PDO, NPG, HDO, BDO-PC, and DMEDA; (c) AA, isophthalic acid, PDO, NPG, HDO, BDO-PC, and EDA; (d) AA, isophthalic acid, PDO, NPG, HDO, BDO-PC, and DMEDA; (e) AA, PDO, NPG, HDO, BDO-PC, and ethanolamine; and (f) combinations thereof.

The PE-A PC may comprise two or more embodiments disclosed herein.

Phosphate-Terminated Polyol

In addition to the PE-A PC, the polyol component may contain a phosphate-terminated polyol.

A "phosphate-terminated polyol" ("PT-PO") is a polyol containing at least one phosphate group having the Structure (B):

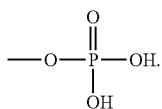

Structure (B)

The PT-PO may be prepared by reacting a polyether polyol with a phosphoric-type acid. A "phosphoric-type acid" is an orthophosphoric acid, a compound made by the condensation of orthophosphoric by the elimination of water, or a combination thereof. Nonlimiting examples of suitable phosphoric-type acid include pyrophosphoric acid, tripolyphosphoric acid, and polyphosphoric acid (PPA). In an embodiment, the PT-PO is the reaction product of a polyether polyol and PPA.

In an embodiment, the PT-PO has the Structure (C):

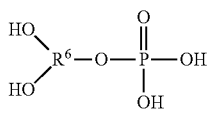

Structure (C)

wherein $R^6$ is an ether group or a substituted ether group.

In an embodiment, $R^6$ is a polyether. In another embodiment, $R^6$ contains only carbon atoms, hydrogen atoms, optional oxygen atoms, and optional phosphorous atoms.

In an embodiment, $R^6$ is selected from a $C_1$-$C_{120}$ ether group, or a $C_1$-$C_{50}$ ether group, or a $C_1$-$C_{24}$ ether group, or a $C_1$-$C_8$ ether group, or a $C_1$-$C_6$ ether group, each of which may optionally contain one or more pendant —OH groups and/or one or more pendant Structure (B) groups.

In an embodiment, the PT-PO has an OH Number from 200 mg KOH/g, or 250 mg KOH/g to 300 mg KOH/g, or 350 mg KOH/g. In an embodiment, the PT-PO has an acid value from 5 mg KOH/g, or 10 mg KOH/g, or 20 mg KOH/g to 25 mg KOH/g, or 30 mg KOH/g, or 50 mg KOH/g.

In an embodiment, the PT-PO has a viscosity at 25° C. from 1000 mPa·s, or 1500 mPa·s, or 1700 mPa·s to 1800 mPa·s, or 2000 mPa·s.

In an embodiment, the PT-PO has a Mn from 500 g/mol, or 750 g/mol to 1000 g/mol, or 1500 g/mol, or 2000 g/mol, or 5000 g/mol, or 8000 g/mol. In an embodiment, the PT-PO has a Mw from 1000 g/mol, or 1400 g/mol to 1500 g/mol, or 2000 g/mol, or 3000 g/mol, or 5000 g/mol, or 8000 g/mol.

In an embodiment, the PT-PO has a Mw/Mn from 1.5, or 1.8 to 2.0, or 2.5.

In an embodiment, the PT-PO contains less than 50 wt %, or less than 40 wt %, or less than 30 wt %, or less than 27 wt %; or from 0 wt %, or 0.01 wt %, or 1 wt % to 26 wt %, or 30 wt %, or 40 wt %, or 50 wt; or from 0 wt % to 30 wt % species having a Mw less than 500 g/mol, based on the total weight of the PT-PO. In an embodiment, the PT-PO contains less than 55 wt %, or less than 50 wt %, or less than 45 wt %, or less than 42 wt %; or from 0 wt %, or 0.01 wt %, or 1 wt % to 42 wt %, or 45 wt %, or 50 wt %, or 55 wt %; or from 0 wt % to 45 wt % species having a Mw less than 1000 g/mol, based on the total weight of the PT-PO. Not wishing to be bound by any particular theory, it is believed that (i) a low level (i.e., less than 50 wt %) of species having a Mw less than 500 g/mol and/or (ii) a low level (i.e., less than 55 wt %) of species having a Mw less than 1000 g/mol in the PT-PO minimizes the amount of migration of low molecular weight species in cured laminating adhesives.

In an embodiment, the PT-PO has one, some, or all of the following properties: (i) an OH Number from 200 mg KOH/g to 350 mg KOH/g, or from 250 mg KOH/g to 300 mg KOH/g; and/or (ii) an acid value from 5 mg KOH/g to 50 mg KOH/g, or from 20 mg KOH/g to 30 mg KOH/g; and/or (iii) a viscosity at 25° C. from 1000 mPa·s to 2000 mPa·s, or from 1700 mPa·s to 1800 mPa·s; and/or (iv) a Mn from 500 g/mol to 8000 g/mol, or from 750 g/mol to 1000 g/mol; and/or (v) a Mw from 1000 g/mol to 8000 g/mol, or from 1400 g/mol to 1500 g/mol; and/or (vi) a Mw/Mn from 1.5 to 2.5, or from 1.8 to 2.0; and/or (vii) from 0 wt % to 30 wt % species having a Mw less than 500 g/mol; and/or (viii) from 0 wt % to 45 wt % species having a Mw less than 1000 g/mol, based on the total weight of the PT-PO; and/or (viii) has the Structure (C); and/or (ix) is the reaction product of a polyether polyol and PPA.

A nonlimiting example of a suitable PT-PO is the PT-PO disclosed in U.S. Patent Publication No. 2017/0226391, the entire contents of which are herein incorporated by reference.

The PT-PO may comprise two or more embodiments disclosed herein.

Optional Additive

In addition to (i) the PE-A PC and (ii) the optional PT-PO, the polyol component may contain (iv) an optional additive.

Nonlimiting examples of suitable optional additives include polyols, adhesion promoters, chain extenders, catalysts, and combinations thereof.

A nonlimiting example of a suitable optional additive is a polyol. The polyol may be any polyol disclosed herein, with the proviso that the optional polyol is different than (i) the PE-A PC and (ii) the PT-PO. The polyol may be compositionally distinct and/or physically distinct from (i) the PE-A PC and (ii) the PT-PO.

Nonlimiting examples suitable polyols include diols (which contain two —OH groups), triols (which contain three —OH groups), and combinations thereof. Nonlimiting examples of suitable diols include 2-methyl-1,3-propanediol (MPG); 3-methyl-1,5-pentanediol; ethylene glycol; butylene glycol; diethylene glycol (DEG); triethylene glycol; polyalkylene glycols, such as polyethylene glycol (PEG); 1,2-propanediol; 1,3-propanediol; 1,3-butanediol; 1,4-butanediol; 1,6-hexanediol; and NPG. A nonlimiting example of a suitable triol is trimethylolpropane (TMP).

In an embodiment, the additive is a polyol that is a polyester polyol, a polyether polyol, or a combination thereof. Nonlimiting examples of suitable polyether polyols include polypropylene glycol PEG, polybutylene glycol, polytetramethylene ether glycol, and combinations thereof.

Nonlimiting examples of a suitable adhesion promoters include aminosilane (e.g., (3-aminopropyl)triethoxysilane and (3-aminopropyl)trimethoxysilane), epoxy silane (e.g., (3-glycidyloxypropyl)trimethoxysilane), phosphate ester (e.g., phosphate ester based on polypropylene glycol), epoxy resin (e.g., epoxy resin based on 1,4-butanediol diglycidyl ether), and combinations thereof.

Nonlimiting examples of suitable chain extenders include glycerine; trimethylol propane; DEG; propanediol; MPG; 3-methyl-1,5-pentanediol; and combinations thereof.

Nonlimiting examples of suitable catalysts include tetra-n-butyl titanate, titanium isoproxide, zinc sulphate, organo tin catalyst (e.g., dibutyltin dilaurate), and combinations thereof.

In an embodiment, the reaction mixture excludes a chain extender.

The optional additive may comprise two or more embodiments disclosed herein.

In an embodiment, the polyol component contains, consists essentially of, or consists of (i) PE-A PC, (ii) optionally, the PT-PO, and (iii) optionally, an additive.

In an embodiment, the polyol component contains from 65 wt %, or 85 wt %, or 90 wt % to 95 wt %, or 100 wt % PE-A PC, based on the total weight of the polyol component.

In an embodiment, the polyol component contains from 65 wt %, or 70 wt %, or 75 wt %, or 80 wt %, or 85 wt %, or 90 wt % to 95 wt %, or 98 wt %, or 99 wt %, or 99.5 wt % PE-A PC; and a reciprocal amount of PT-PO, or from 0.5 wt %, or 1 wt %, or 2 wt %, or 5 wt % to 10 wt %, or 15 wt %, or 20 wt %, or 25 wt %, or 30 wt %, or 35 wt % PT-PO, based on the total weight of the polyol component. In another embodiment, the polyol component contains from 65 wt % to 99.5 wt %, or from 70 wt % to 99 wt %, or from 75 wt % to 95 wt %, or from 85 wt % to 95 wt % PE-A PC; and from 0.5 wt % to 35 wt %, or from 1 wt % to 30 wt %, or from 1 wt % to 25 wt %, or from 5 wt % to 15 wt % PT-PO.

In an embodiment, the polyol component has an OH Number from 50 mg KOH/g, or 100 mg KOH/g to 160 mg KOH/g, or 200 mg KOH/g.

It is understood that the sum of the components in each of the components, mixtures, compositions, and layers disclosed herein, including the foregoing polyol component, yields 100 weight percent (wt %), based on the total weight of the respective component, mixture, composition, or layer.

The polyol component may comprise two or more embodiments disclosed herein.

C. Two-Component Solvent-Less Adhesive Composition

The two-component solvent-less adhesive composition contains the reaction product of (A) the NCO Component; and (B) the polyol component containing the PE-A PC and (ii) optionally, PT-PO.

The two-component solvent-less adhesive composition is formed by mixing (A) the NCO Component and (B) the polyol component under conditions suitable to react the —NCO groups of the NCO Component with the —OH groups of the polyol component. In an embodiment, (A) the NCO Component and (B) the polyol component are combined and mixed at a temperature from 15° C., or 20° C. to 23° C., or 25° C., or 45° C. for a period from 10 minutes to 30 minutes.

In an embodiment, the two-component solvent-less adhesive composition includes (A) NCO Component and (B) polyol component at an Isocyanate:Polyol Weight Ratio, based on dry weight, from 100:100, or 100:125, or 100:132 to 100:189, or 100:190, or 100:195, or 100:200; or from 100:100 to 100:200, or from 100:125 to 100:195, or from 100:133 to 100:189.

The two-component solvent-less adhesive composition is void of, or substantially void of, a solvent.

In an embodiment, the two-component solvent-less adhesive composition contains, consists essentially of, or consists of, the reaction product of (A) an NCO Component comprising an aliphatic isocyanate prepolymer;
(B) a polyol component containing, consisting essentially of, or consisting of
  (i) from 65 wt % to 100 wt %, or 65 wt % to 99.5 wt %, or from 85 wt % to 95 wt % PE-A PC, based on the total weight of the polyol component, the PE-A PC having one, some, or all of the following properties: (a) a Mn from 500 g/mol to 8000 g/mol, or from 1000 g/mol to 2000 g/mol; and/or (b) a Mw from 500 g/mol to 5000 g/mol, or from 2000 g/mol to 3500 g/mol; and/or (c) a Mw/Mn from 1.5 to 2.5, or from 1.6 to 1.2; and/or (d) an acid value from 0.01 mg KOH/g to 2.0 mg KOH/g, or from 0.01 mg KOH/g to 1.6 mg KOH/g; and/or (e) an OH Number from 100 mg KOH/g to 200 mg KOH/g, or from 100 mg KOH/g to 150 mg KOH/g; and/or (f) a Tg from −90° C. to −50° C., or from −80° C. to −55° C.; and/or (g) a viscosity at 25° C. from 500 mPa·s to 5000 mPa·s, or from 900 mPa·s to 3000 mPa·s; and/or (h) a viscosity at 40° C. from 300 mPa·s to 4000 mPa·s, or from 350 mPa·s to 2000 mPa·s; and/or (i) from 0 wt % to 10 wt % species having a Mw less than 500 g/mol; and/or (j) from 0 wt % to 30 wt % species having a Mw less than 1000 g/mol, based on the total weight of the PE-A PC; and/or (k) has the Structure (A); and/or (l) is selected from the reaction product of (1) AA, PDO, NPG, HDO, BDO-PC, and EDA; (2) AA, PDO, NPG, HDO, BDO-PC, and DMEDA; (3) AA, isophthalic acid, PDO, NPG, HDO, BDO-PC, and EDA; (4) AA, isophthalic acid, PDO, NPG, HDO, BDO-PC, and DMEDA; (5) AA, PDO, NPG, HDO, BDO-PC, and ethanolamine; and (6) combinations thereof;
  (ii) optionally, from 0.5 wt % to 35 wt %, or from 5 wt % to 15 wt % PT-PO, based on the total weight of the polyol component, the PT-PO having one, some all of the following properties: (a) an OH Number from 200 mg KOH/g to 350 mg KOH/g, or from 250 mg KOH/g to 300 mg KOH/g; and/or (b) an acid value from 5 mg KOH/g to 50 mg KOH/g, or from 20 mg KOH/g to 30 mg KOH/g; and/or (c) a viscosity at 25° C. from 1000 mPa·s to 2000 mPa·s, or from 1700 mPa·s to 1800 mPa·s; and/or (d) a Mn from 500 g/mol to 8000 g/mol, or from 750 g/mol to 1000 g/mol; and/or (e) a Mw from 1000 g/mol to 8000 g/mol, or from 1400 g/mol to 1500 g/mol; and/or (f) a Mw/Mn from 1.5 to 2.5, or from 1.8 to 2.0; and/or (g) from 0 wt % to 30 wt % species having a Mw less than 500 g/mol; and/or (h) from 0 wt % to 45 wt % species having a Mw less than 1000 g/mol, based on the total weight of the PT-PO; and/or (i) has the Structure (C); and/or (j) is the reaction product of a polyether polyol and PPA; and
(C) optionally, an additive;
wherein the two-component solvent-less adhesive composition has an Isocyanate:Polyol Weight Ratio, based on dry weight, from 100:100 to 100:200, or from 100:133 to 100:189.

The two-component solvent-less adhesive composition may comprise two or more embodiments disclosed herein.

D. Laminate

The present disclosure provides a laminate. The laminate includes a first substrate, a second substrate, and an adhesive layer between the first substrate and the second substrate. The adhesive layer is formed from the two-component solvent-less adhesive composition.

The two-component solvent-less adhesive composition may be any two-component solvent-less adhesive composition disclosed herein.

The laminate includes a first substrate and a second substrate. The first substrate and the second substrate may be the same or different. In an embodiment, the first substrate and the second substrate are the same, such that they have the identical compositions and identical structures.

In an embodiment, the first substrate and the second substrate are compositionally distinct and/or structurally distinct from one another.

It is understood that the below description referring to a "substrate" refers to the first substrate and the second substrate, individually and/or collectively.

A nonlimiting example of a suitable substrate is a film. The film may be a monolayer film or a multilayer film. The multilayer film contains two layers, or more than two layers. For example, the multilayer film can have two, three, four, five, six, seven, eight, nine, ten, eleven, or more layers. In an embodiment, the multilayer film contains only two layers, or only three layers.

In an embodiment, the film is a monolayer film with one, and only one, layer.

In an embodiment, the film includes a layer containing a component selected from ethylene-based polymer, propylene-based polymer (PP), polyamide (such as nylon), polyester, ethylene vinyl alcohol (EVOH) copolymer, polyethylene terephthalate (PET), ethylene vinyl acrylate (EVA) copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacylic acid, maleic anhydride grafted ethylene-based polymer, a polylactic acid (PLA), a polystyrene, a metal foil, a cellulose, cellophane, nonwoven fabric, and combinations thereof. A nonlimiting example of a suitable metal foil is aluminum foil. Each layer of a multilayer film may for formed from the same component, or from different components.

In an embodiment, the film includes a layer containing metal foil.

The substrate, and further the film, is a continuous structure with two opposing surfaces.

In an embodiment, the substrate has a thickness from 5 μm, or 10 μm, or 15 μm, or 20 μm to 25 μm, or 30 μm, or 40 μm, or 50 μm, or 100 μm, or 200 μm, or 300 μm, or 400 μm, or 500 μm.

In an embodiment, the first substrate is a film having a layer that is a metal foil layer; and the second substrate is a monolayer film having a single layer that is an ethylene-based polymer layer (such as low density polyethylene (LDPE)) or a propylene-based polymer layer (such as polypropylene).

The first substrate may comprise two or more embodiments disclosed herein.

The second substrate may comprise two or more embodiments disclosed herein.

The two-component solvent-less adhesive composition is applied between the first substrate and the second substrate, such as with a Nordmeccanica Labo Combi laminator.

Nonlimiting examples of suitable application methods include brushing, pouring, spraying, coating, rolling, spreading, and injecting.

In an embodiment, the two-component solvent-less adhesive composition is applied between the first substrate and the second substrate at a coat weight from 1.6 grams per square meter (g/m$^2$) to 2.0 g/m$^2$.

In an embodiment, the two-component solvent-less adhesive composition is uniformly applied between the first substrate and the second substrate. A "uniform application" is a layer of the composition that is continuous (not intermittent) across a surface of the substrate, and of the same, or substantially the same, thickness across the surface of the substrate. In other words, a composition that is uniformly applied to a substrate directly contacts the substrate surface, and the composition is coextensive with the substrate surface.

The two-component solvent-less adhesive composition and the first substrate are in direct contact with each other. The term "directly contacts," as used herein, is a layer configuration whereby a substrate is located immediately adjacent to a two-component solvent-less adhesive composition, or an adhesive layer and no intervening layers, or no intervening structures, are present between the substrate and the two-component solvent-less adhesive composition, or the an adhesive layer. The two-component solvent-less adhesive composition directly contacts a surface of the first substrate.

The structure containing the first substrate, the second substrate, and the two-component solvent-less adhesive composition has the following Structure (H):

First Substrate/Two-Component Solvent-Less Adhesive Composition/Second Substrate     Structure (H).

The adhesive layer of Structure (H) is formed from curing the two-component solvent-less adhesive composition. The two-component solvent-less adhesive composition is formed from mixing and reacting the (A) NCO Component and the (B) polyol component.

In an embodiment, the two-component solvent-less adhesive composition is cured in an oven at a temperature from 30° C., or 35° C. to 40° C., or 45° C., or 50° C.

In an embodiment, the two-component solvent-less adhesive composition is cured at a temperature from 20° C. to 25° C. for a period of from 1 day to 2 days, or 4 days, or 7 days.

In an embodiment, the Structure (H) is cured to form an adhesive layer between the first substrate and the second substrate, thereby forming a laminate. The laminate has the following Structure (J): First Substrate/Adhesive Layer/Second Substrate Structure (J).

The laminate includes the first substrate in direct contact with the adhesive layer, and the second substrate in direct contact with the adhesive layer.

In an embodiment, the first substrate is a film having a layer that is a metal foil layer, and the second substrate is a monolayer film having a single layer that is an ethylene-based polymer (such as LDPE). In a further embodiment, the laminate has one, some, or all of the following properties after 25° C. curing: (i) a bond strength after two days from 1.5 N/2.54 cm, or 1.6 N/2.54 cm to 4.6 N/2.54 cm, or 9.0 N/2.54 cm; and/or (ii) a bond strength after four days from 2.0 N/2.54 cm, or 2.5 N/2.54 cm to 6.0 N/2.54 cm, or 9.0 N/2.54 cm; and/or (iii) a bond strength after seven days from 2.5 N/2.54 cm, or 2.6 N/2.54 cm to 4.2 N/2.54 cm, or 8.0 N/2.54 cm; and/or (iv) a bond strength after fourteen days from 2.0 N/2.54 cm, or 2.5 N/2.54 cm to 4.0 N/2.54 cm, or 60.0 N/2.54 cm; and/or (v) a bond strength after the boil-in-bag test from 1.5 N/2.54 cm, or 1.6 N/2.54 cm to 3.1 N/2.54 cm, or 8.0 N/2.54 cm; or from 1.5 N/2.54 cm to 8.0 N/2.54 cm. In another embodiment, the laminate has one, some, or all of the following properties after 45° C. curing: (i) a bond strength after one day from 3.0 N/2.54 cm to 4.5 N/2.54 cm, or 7.0 N/2.54 cm; and/or (ii) a bond strength after seven days from 2.9 N/2.54 cm to 6.0 N/2.54 cm, or 8.0 N/2.54 cm; and/or (iii) a bond strength after fourteen days from 2.5 N/2.54 cm to 4.0 N/2.54 cm, or 7.0 N/2.54 cm; and/or (iv) a bond strength after the boil-in-bag test from 1.4 N/2.54 cm to 5.5 N/2.54 cm, or 8.0 N/2.54 cm; and/or (v) a bond strength after chemical aging from 0.15 N/2.54 cm, or 0.19 N/2.54 cm to 0.50 N/2.54 cm, or 3.0 N/2.54 cm.

In an embodiment, the first substrate is a film having a layer that is a metal foil layer, and the second substrate is a monolayer film having a single layer that is a propylene-based polymer (such as polypropylene, or further a cast polypropylene). In a further embodiment, the laminate has one, some, or all of the following properties after 25° C. curing: (i) a bond strength after two days from 0.01 N/2.54 cm, or 0.03 N/2.54 cm, or 1.0 N/2.54 cm to 5.5 N/2.54 cm, or 8.0 N/2.54 cm; and/or (ii) a bond strength after four days from 1.5 N/2.54 cm, or 2.0 N/2.54 cm to 6.3 N/2.54 cm, or 7.0 N/2.54 cm; and/or (iii) a bond strength after seven days from 2.0 N/2.54 cm, or 2.5 N/2.54 cm, or 5.0 N/2.54 cm to 6.0 N/2.54 cm, or 8.0 N/2.54 cm; and/or (iv) a bond strength after fourteen days from 2.5 N/2.54 cm, or 3.0 N/2.54 cm to 6.0 N/2.54 cm, or 8.0 N/2.54 cm; and/or (v) a bond strength after the boil-in-bag test from 0.5 N/2.54 cm, or 0.80 N/2.54 cm to 2.2 N/2.54 cm, or 5.0 N/2.54 cm; or from 0.50 N/2.54 cm to 5.0 N/2.54 cm; and/or (vi) a bond strength after chemical aging from 0.5 N/2.54 cm, or 0.80 N/2.54 cm to 2.0 N/2.54 cm, or 5.0 N/2.54 cm; or from 0.5 N/2.54 cm to 5.0 N/2.54 cm. In another embodiment, the laminate has one, some, or all of the following properties after 45° C. curing: (i) a bond strength after one day from 6.0 N/2.54 cm, or 6.4 N/2.54 cm to 8.5 N/2.54 cm, or 10.0 N/2.54 cm; and/or (ii) a bond strength after seven days from 5.5 N/2.54 cm, or 5.8 N/2.54 cm to 11.0 N/2.54 cm, or 13.0 N/2.54 cm; and/or (iii) a bond strength after fourteen days from 5.0 N/2.54 cm, or 5.50 N/2.54 cm to 8.0 N/2.54 cm, or 12.0 N/2.54 cm; and/or (iv) a bond strength after the boil-in-bag test from 1.0 N/2.54 cm to 5.0 N/2.54 cm, or 8.0 N/2.54 cm; and/or (v) a bond strength after chemical aging from 0.5 N/2.54 cm, or 0.8 N/2.54 cm to 1.1 N/2.54 cm, or 5.0 N/2.54 cm; or from 0.5 N/2.54 cm to 5.0 N/2.54 cm, or from 0.5 N/2.54 cm to 1.5 N/2.54 cm.

In an embodiment, the first substrate is a monolayer film having a single layer that is PET, and the second substrate is a monolayer film having a single layer that is an ethylene-based polymer (such as LDPE). In a further embodiment, the laminate has one, some, or all of the following properties after 25° C. curing: (i) a bond strength after two days from 1.0 N/2.54 cm, or 1.2 N/2.54 cm to 9.2 N/2.54 cm, or 10.0 N/2.54 cm; and/or (ii) a bond strength after four days from 4.0 N/2.54 cm, or 4.2 N/2.54 cm to 12.2 N/2.54 cm, or 15.0 N/2.54 cm; and/or (iii) a bond strength after seven days from 6.0 N/2.54 cm, or 10.0 N/2.54 cm to 12.5 N/2.54 cm, or 15.0 N/2.54 cm; and/or (iv) a bond strength after fourteen days from 6.0 N/2.54 cm, or 10.0 N/2.54 cm to 14.2 N/2.54 cm, or 17.0 N/2.54 cm; and/or (v) a bond strength after the boil-in-bag test from 3.0 N/2.54 cm, or 3.5 N/2.54 cm, or 4.0 N/2.54 cm to 4.6 N/2.54 cm, or 10.0 N/2.54 cm; or from 3.0 N/2.54 cm to 10.0 N/2.54 cm; or from 4.0 N/2.54 cm to 10.0 N/2.54 cm; and/or (vi) a bond strength after chemical aging from 2.5 N/2.54 cm, or 2.9 N/2.54 cm to 6.0 N/2.54 cm, or 10.0 N/2.54 cm; or from 2.5 N/2.54 cm to 10.0 N/2.54 cm. In another embodiment, the laminate has one, some, or all of the following properties after 45° C. curing: (i) a bond strength after one day from 13.0 N/2.54 cm to 20.0 N/2.54 cm, or 30.0 N/2.54 cm; and/or (ii) a bond strength after seven days from 12.0 N/2.54 cm, or 13.0 N/2.54 cm to 19.0 N/2.54 cm, or 20.0 N/2.54 cm; and/or (iii) a bond strength after fourteen days from 10.0 N/2.54 cm to 15.0 N/2.54 cm, or 18.0 N/2.54 cm; and/or (iv) a bond strength after the boil-in-bag test from 2.0 N/2.54 cm, or 3.5 N/2.54 cm, or 4.0 N/2.54 cm to 9.0 N/2.54 cm, or 10.0 N/2.54 cm; or from 2.0 N/2.54 cm to 10.0 N/2.54 cm; or from 4.0 N/2.54 cm to 10.0 N/2.54 cm; and/or (v) a bond strength after chemical aging from 2.5 N/2.54 cm to 5.0 N/2.54 cm, or 10.0 N/2.54 cm.

In an embodiment, the first substrate is a monolayer film having a single layer that is PET, and the second substrate is a monolayer film having a single layer that is a propylene-based polymer (such as polypropylene, or further a cast polypropylene). In a further embodiment, the laminate has one, some, or all of the following properties after 25° C. curing: (i) a bond strength after two days from 0.05 N/2.54 cm to 1.30 N/2.54 cm, or 2.00 N/2.54 cm; and/or (ii) a bond strength after four days from 3.0 N/2.54 cm, or 5.0 N/2.54 cm to 12.0 N/2.54 cm, or 20.0 N/2.54 cm; or from 3.0 N/2.54 cm to 20.0 N/2.54 cm; and/or (iii) a bond strength after seven days from 7.0 N/2.54 cm to 16.0 N/2.54 cm, or 20.0 N/2.54 cm; and/or (iv) a bond strength after fourteen days from 7.0 N/2.54 cm to 14.1 N/2.54 cm, or 18.0 N/2.54 cm; and/or (v) a bond strength after the boil-in-bag test from 3.5 N/2.54 cm, or 4.0 N/2.54 cm, or 4.3 N/2.54 cm to 6.0 N/2.54 cm, or 10.0 N/2.54 cm; or from 3.5 N/2.54 cm to 10.0 N/2.54 cm; and/or (vi) a bond strength after chemical aging from 6.0 N/2.54 cm, or 7.9 N/2.54 cm to 10.0 N/2.54 cm, or 15.0 N/2.54 cm; or from 6.0 N/2.54 cm to 15.0 N/2.54 cm. In another embodiment, the laminate has one, some, or all of the following properties after 45° C. curing: (i) a bond strength after one day from 9.0 N/2.54 cm to 15.0 N/2.54 cm, or 20.0 N/2.54 cm; and/or (ii) a bond strength after seven days from 9.0 N/2.54 cm, or 9.6 N/2.54 cm to 14.0 N/2.54 cm, or 20.0 N/2.54 cm; and/or (iii) a bond strength after fourteen days from 10.0 N/2.54 cm to 18.0 N/2.54 cm, or 20.0 N/2.54 cm; and/or (iv) a bond strength after the boil-in-bag test from 3.5 N/2.54 cm, or 4.0 N/2.54 cm, or 6.5 N/2.54 cm, or 8.0 N/2.54 cm to 9.0 N/2.54 cm, or 10.0 N/2.54 cm; or from 3.5 N/2.54 cm to 10.0 N/2.54 cm; and/or (v) a bond strength after chemical aging from 7.0 N/2.54 cm, or 7.5 N/2.54 cm to 9.0 N/2.54 cm, or 15.0 N/2.54 cm.

In an embodiment, the laminate includes a first substrate that is a metal foil film and a second substrate that is a polypropylene film, and the laminate has a bond strength after chemical aging from 0.5 N/2.54 cm to 5.0 N/2.54 cm, or from 0.90 N/2.54 cm to 5.0 N/2.54 cm.

In an embodiment, the laminate includes a first substrate that is a PET film and the laminate has a bond strength after the boil-in-bag test from 3.5 N/2.54 cm to 10.0 N/2.54 cm, or from 4.0 N/2.54 cm to 10.0 N/2.54 cm.

The laminate may comprise two or more embodiments disclosed herein.

E. Method of Forming a Two-Component Solvent-Less Adhesive Composition

The present disclosure also provides a method of forming the two-component solvent-less adhesive composition. In an embodiment, the method includes (A) providing a polyol component containing (i) a PE-A PC and (ii) optionally, a PT-PO; (B) providing an NCO Component; and (C) reacting the polyol component with the NCO Component to form the two-component solvent-less adhesive composition.

The polyol component, the PE-A PC, the PT-PO, the NCO Component, and the two-component solvent-less adhesive composition may be any respective polyol component, PE-A PC, PT-PO, NCO Component, and two-component solvent-less adhesive composition disclosed herein.

The method may comprise two or more embodiments disclosed herein.

The present disclosure also provides an article containing the laminate. Nonlimiting examples of suitable articles include packages, bags, pouches, deep-drawn cans, and containers.

In an embodiment, the laminate contacts a comestible. A "comestible" is an edible food item.

By way of example, and not limitation, some embodiments of the present disclosure will now be described in detail in the following Examples.

EXAMPLES

The materials used in the examples are provided in Table 1 below.

TABLE 1

| Material | Properties | Source |
|---|---|---|
| TYZOR ™ TPT | tetra-isopropyl titanate (catalyst) | Sigma |
| FASCAT ™ 9100 | hydroxybutyltin oxide (catalyst) | PMC |
| DER ™ 731 | diglycidyl ether of 1,4-butanediol | Olin Epoxy |
| ADCOTE ™ 577 | aromatic isocyanate prepolymer | DCC |
| MOR-FREE ™ C-33 | aliphatic isocyanate prepolymer | DCC |
| MOR-FREE ™ L82-105 | solvent-free hydroxyl-terminated polyol composition | DCC |
| MOR-FREE ™ 1390A | solvent-free hydroxyl-terminated polyol composition | DCC |
| VORANOL ™ CP 450 | glycerine propoxylated polyether triol (polyether polyol) OH number = 370-396 mg KOH/g; acid number = 0.050 mg KOH/g | DCC |
| ISONATE ™ 125M | MDI blend of 98 wt % 4,4'-diphenylmethane diisocyanate and 2 wt % 2,4'-diphenylmethane diisocyanate; NCO content = 33.2 wt % | DCC |
| adipic acid (AA) | aliphatic diacid monomer | Aldrich |
| isopthalic acid (IPA) | aromatic diacid monomer | TCI America |
| 1,6-hexanediol (HDO) | diol monomer | Aldrich |
| neopentyl glycol (NPG) | diol monomer | Aldrich |
| 1,2-propanediol (PDO) | diol monomer | Aldrich |
| 1,4-butanediol (BDO) | diol monomer | Aldrich |
| N,N'-dimethylethylene diamine (DMEDA) | amine monomer | Aldrich |
| ethylenediamine (EDA) | amine monomer | Aldrich |
| ethanolamine | amine monomer | Aldrich |
| dimethyl carbonate (DMC) | carbonate ester | Aldrich |

DCC = The Dow Chemical Company
PMC = PMC Organometallix

A. Preparation of the Polyester-Polycarbonate Polyol

Preparation of Poly(1,4-Butanediol-Carbonate) (BDO-PC): A 30 gal. 316L stainless steel vessel having an internal diameter of 20 in. is equipped with internal baffles, a variable speed 12-in. turbine impeller, a sparge ring, a closed loop system with a mixed DOWTHERM™ system having independent hot and cold loops and a 24-inch packed column. To the reactor, 67958.0 grams (g) BDO is added and heated to 150° C. while sweeping with $N_2$ to inert the reactor and remove water present in the BDO. TYZOR™ TPT catalyst (21.6 g) is added and the line is flushed with 600.0 g BDO previously purged from the reactor. DMC (102864.0 g) is added from a weight pot using a flow meter and control valve over a period of 6 to 8 hrs, while maintaining the temperature in the column at 65° C. Upon completion of the DMC addition, the temperature is increased to 195° C., and the progress of the reaction is tracked by OH number and $^1$H-NMR for end-group analysis. After 8 hrs at 195° C., the OH number is found to be 30.7 with 25% carbonate end-groups by $^1$-NMR. The temperature is decreased to 150° C. and 4.1 pounds (lbs) of BDO is added to the reaction. The temperature is brought up to 195° C. and after 8 hrs, the OH number is found to be 54 mg KOH/g with less than 1% carbonate end-groups. A poly(1,4-butanediol-carbonate) (BDO-PC) is prepared that has an OH number of 54 mg KOH/g and a Mn of 1960 g/mol.

Preparation of Polyester-Amide Polycarbonate Polyols (PE-APC): Polyester-polycarbonate polyols are synthesized according to the following general procedure, with detailed formulation compositions for each sample provided in Table 2. The reaction is run in a glass reactor with a 1000 mL three neck flask equipped with a thermocouple inlet port. One neck of the reactor contains a gas inlet adapter that contains a 29/42 neck with a stopper attached. The gas inlet is fed with $N_2$ regulated by an adjustable flow meter. The second neck of the reactor contains a custom mechanical stirring shaft adapter modified to allow for a vacuum use. The third neck of the reactor contains an offset adapter attached to a 12-inch long column leading to distillation head and a condenser with a three neck bottom drain collection flask at a bottom of condenser. The collection flask has one line leading to a J-KEM™ vacuum regulator, and another line leading to a $N_2$ bubbler. The 12-inch column off of the offset adapter is packed with 5 mm glass beads. The column is heated by way of a heating tape controlled by a variac with a thermocouple monitoring column surface temperature. Heating for the reactor is supplied by a heating mantle fed from a control box with over-temp shut-off. Mechanical stirring is achieved using a custom ¼ inch stainless steel paddle and shaft. The reactor is charged with HDO, NPG, PDO, and amine mononer. The mixture is vacuum degassed and $N_2$ purged up to three times, and then slowly heated to less than 100° C. Adipic acid (or adipic acid and isophthalic acid) is added and the mixture and allowed to stir for approximately one hour. The temperature is then increased to 150° C. and titanium isopropoxide (supplied by Aldrich) is injected. The temperature of the reaction is raised incrementally, as distillate begins to slow, up to 210° C. Moderate vacuum pressure is applied to drive the reaction to completion. The acid value is monitored to determine the end-point of the reaction. When the acid value is lower than 1.0, the polyester component is deemed complete. Then, the BDO-PC prepared as described above and HDO (equimolar to BDO-PC) are added to the polyester component, at room temperature, and the solution is heated to 210° C. for four hours.

TABLE 2

|  | PE-A PC 1 | PE-A PC 2 | PE-A PC 3 | PE-A PC 4 | PE-A PC 5 | PE-A PC 6 | PE-A PC 7 | PE-A PC 8 | PE-A PC 9 | PE-A PC 10 | Polyester 11 |
|---|---|---|---|---|---|---|---|---|---|---|---|
| adipic acid[1] | 34.47 | 34.20 | 40.68 | 34.36 | 34.53 | 30.23 | 25.49 | 25.78 | 34.62 | 35.09 | 45.61 |
| isophthalic acid[1] | — | — | — | — | — | 5.05 | 10.12 | 10.13 | — | — | — |
| PDO[1] | 10.73 | 10.67 | 12.64 | 10.67 | 10.75 | 10.62 | 11.24 | 10.5 | 10.46 | 10.36 | 13.86 |
| NPG[1] | 9.07 | 9.74 | 10.70 | 9.05 | 9.62 | 8.97 | 8.80 | 8.87 | 9.58 | 9.57 | 11.66 |
| HDO[1] | 22.11 | 21.90 | 25.07 | 22.00 | 18.92 | 21.88 | 21.36 | 21.71 | 21.49 | 21.91 | 28.85 |
| BDO-PC[1] | 22.90 | 22.73 | 10.09 | 22.86 | 22.81 | 22.55 | 22.20 | 22.30 | 22.31 | 22.33 | — |
| DMEDA[1] | — | — | — | 1.06 | 3.38 | — | — | — | — | — | — |
| EDA[1] | 0.71 | 0.75 | 0.83 | — | — | 0.71 | 0.80 | 0.71 | — | — | — |
| ethanolannine[1] | — | — | — | — | — | — | — | — | 1.54 | 0.74 | — |
| Acid Value[2] | 1.00 | 0.13 | 0.01 | 0.25 | NM | 0 | 0 | 0 | 1.54 | 0.74 | 0.49 |
| OH Number[2] | 148.6 | 140.6 | 135.6 | 137.1 | 115.2 | 118.3 | 147.4 | 112.1 | 131.7 | 102.9 | 150.8 |
| Tg (° C.) | −66.2 | −72.3 | −65.3 | −67.9 | −65.6 | −62.2 | −61.7 | −56.5 | −68.2 | −67.7 | −63.6 |
| Viscosity @ 25° C.[3] | 1852 | 2800 | 2481 | 1150 | 1118 | 2325 | 1689 | 4061 | 972 | 1994 | 2560 |
| Viscosity @ 40° C.[3] | 705 | 1081 | 834 | 463 | 434 | 791 | 605 | 1270 | 385 | 764 | 733 |
| Mn (g/mol) | 1584 | 1626 | 1622 | 1537 | 1162 | 1164 | 1131 | 1354 | 1055 | 1445 | 1363 |
| Mw (g/mol) | 2881 | 2784 | 2749 | 2587 | 2111 | 2160 | 2038 | 2734 | 2121 | 3063 | 2729 |
| Mz (g/mol) | 4554 | 4264 | 4206 | 4036 | 3252 | 3327 | 3107 | 4333 | 3407 | 4945 | 4309 |
| Mw/Mn | 1.82 | 1.71 | 1.70 | 1.68 | 1.82 | 1.85 | 1.80 | 2.02 | 2.01 | 2.12 | 2.00 |
| wt % species with Mw <500 g/mol | 4.8 | 4.6 | 4.7 | 4.9 | 8.4 | 7.0 | 7.7 | 5.5 | 9.0 | 5.7 | 7.5 |
| wt % species with Mw <1000 g/mol | 17.3 | 17.4 | 17.6 | 19.0 | 25.2 | 20.1 | 25.2 | 16.6 | 25.8 | 15.8 | 18.5 |

[1]monomer weight charges (%), based on the total amount of monomer charged
NM = not measured
[2]Acid Vale and OH Number are measured in mg KOH/g.
[3]Viscosity is measured in mPa · s.

B. Preparation of the Phosphate-Terminated Polyol

A 1 liter multi-neck round bottom flask is dried in an oven, flushed with dry nitrogen for 30 min., and charged with 149.96 grams of VORANOL™ CP 450 (polyether polyol) and is placed under an N₂ sweep of 70 mL/min. A syringe is loaded with 3.395 g of 115% polyphosphoric acid (PPA) (supplied by Sigma Aldrich). The PPA is added dropwise to the VORANOL™ CP 450 with strong agitation. A minimal temperature increase is observed. The reactor contents are heated to 100° C. for 1 hr, and are then cooled to 45° C. 21.65 g ISONATE™125M (MDI blend) is slowly added to the reactor. A significant exotherm is controlled with the application of an ice bath to keep the reaction pot below 75° C. The development of a yellow to amber color is observed. The reactor is then maintained at 65° C. for 1 hr, at which point the content is cooled and packaged. The prepared phosphate-terminated polyol (PT-PO) does not contain excess, or free, MDI. The PT-PO has a solids content of 100 wt %, an OH Number of 270 mg KOH/g, an acid value of 24.0 mg KOH/g, a viscosity at 25° C. of 17,820 mPa·s, a Mn of 780 g/mol, a Mw of 1415 g/mol, a Mz of 2325 g/mol, and a Mw/Mn of 1.82. The PT-PO contains 26.0 wt % species with a Mw less than 500 g/mol, and 41.3 wt % species with a Mw less than 1000 g/mol.

C. Preparation of the Polyol Component

The PE-A PC 1-10, and Polyester 11 prepared as described above are mixed with the PT-PO to form sample polyol components. The composition and the properties of each sample polyol component are provided in Table 3. In the tables, "CS" refers to a comparative sample.

D. Preparation of Two-Component Solvent-Less Adhesive Compositions

Two-component solvent-less adhesive compositions are prepared by mixing (A) MOR-FREE™ C-33 (aliphatic isocyanate prepolymer) with (B) one of the Example Polyol Components (Ex PC) 1-4 or 8-13, Comparative Sample Polyol Components (CS PC) 5-7, MOR-FREE L82-105, or MOR-FREE 1390A, in a kettle at room temperature (23° C.) until a homogeneous mixture is achieved, forming a two-component solvent-less adhesive composition. The components of each example and comparative example adhesive composition are provided in Tables 4 and 5.

TABLE 3

|  | Ex PC 1 | Ex PC 2 | Ex PC 3 | Ex PC 4 | CS PC 5 | CS PC 6 | CS PC 7 | Ex PC 8 | Ex PC 9 | Ex PC 10 | Ex PC 11 | Ex PC 12 | Ex PC 13 |
|---|---|---|---|---|---|---|---|---|---|---|---|---|---|
| PE-A PC 1 | 94.8 | — | — | — | — | — | — | — | — | — | — | — | — |
| PE-A PC 2 | — | 90.0 | 85.0 | — | — | — | — | — | — | — | — | — | — |
| PE-A PC 3 | — | — | — | 95.0 | — | — | — | — | — | — | — | — | — |
| PE-A PC 5 | — | — | — | — | — | — | — | — | 95.0 | — | — | — | — |
| PE-A PC 6 | — | — | — | — | — | — | — | — | — | 95.0 | — | — | — |
| PE-A PC 7 | — | — | — | — | — | — | — | — | — | — | 94.8 | — | — |
| PE-A PC 8 | — | — | — | — | — | — | — | — | — | — | — | 94.9 | — |
| PE-A PC 9 | — | — | — | — | — | — | — | — | — | — | — | — | — |
| PE-A PC 10 | — | — | — | — | — | — | — | — | — | — | — | 95.0 | — |
| PE-A PC 10 | — | — | — | — | — | — | — | — | — | — | — | — | 94.9 |
| Polyester 11 | — | — | — | — | 95.0 | 89.9 | 85.3 | — | — | — | — | — | — |
| PT-PO | 5.2 | 10.0 | 15.0 | 5.0 | 5.0 | 10.1 | 14.7 | 5.0 | 5.0 | 5.2 | 5.1 | 5.0 | 5.1 |
| OH Number (mg KOH/g) | 153.9 | 152.9 | 157.8 | 141.6 | 156.0 | 161.2 | 166.4 | 122.2 | 125.1 | 152.8 | 119.3 | 137.9 | 110.5 | wt % in Table 3 is based on the total weight of the respective Polyol Component (PC)

E. Formation of a Laminate

A low density polyethylene (LDPE) film containing a slip agent that is a monolayer film having a thickness of 1.5 mils is provided (GF-19, available from Berry Plastics Corp.).

A cast polypropylene film that is a monolayer film having a thickness of 3 mil is provided.

A poly(ethylene glycol-terephtha late) (PET) film that is a monolayer film having a thickness of 1 mil (24.5 µm) is provided (92LBT, available from DuPont).

A metal foil film is provided (aluminum foil). The metal foil film is a monolayer film having a thickness of 1.5 mils (38.1 µm). The metal foil film is pre-laminated with a PET film (having a thickness of 12 µm, 48 gauge) using ADCOTE™ 577: Coreactant F (a solvent-based, 2-component polyurethane adhesive, commercially available from The Dow Chemical Company) at a coat weight of 3.26 g/m² (2.00 lbs/ream) to form a Metal Foil Pre-Laminate (Prelam) having the following Structure (I):

PET Film/ADCOTE™ 577:Coreactant F Adhesive Layer/Metal Foil Film Structure (I).

The example and comparative example adhesive compositions are loaded into a Nordmeccanica Labo Combi pilot laminator. The laminator nip temp. is maintained at 60° C., the oven temp. is set at 25° C. for each zone, and the laminator is operated at a speed of 30 meters per minute.

The adhesive composition is applied to either the Metal Foil Pre-Laminate (Prelam) or the PET film (92LBT), to form the following Structure (II) and Structure (III):

Prelam/Adhesive Composition    Structure (II)

PET/Adhesive Composition    Structure (III)

In Structure (II), the adhesive composition directly contacts the surface of the metal foil film layer of the Metal Foil Pre-Laminate (having the Structure (I)).

The LDPE film or the cast polypropylene film is brought into contact with the adhesive layer to form a laminate having the Structure (IV), the Structure (V), the Structure (VI), or the Structure (VII):

Prelam/Adhesive Composition/LDPE    Structure (IV)

Prelam/Adhesive Composition/Cast Polypropylene    Structure (V)

PET/Adhesive Composition/LDPE    Structure (VI)

PET/Adhesive Composition/Cast Polypropylene    Structure (VII)

Two samples of each example and comparative example laminate are formed. One sample is cured at 25° C. and 50% relative humidity, as shown in Table 4. The other sample is cured at 45° C. in an isotherm oven at a relative humidity of 30%, as shown in Table 5. The properties of each laminate example and comparative sample are provided in Tables 4 and 5. In Tables 4 and 5, "FS" indicates a film stretch failure mode (FM); "FT" indicates a film tear or break FM; "DL" indicates a delamination FM; "AT" indicates an adhesive transfer FM, with adhesive transferred to the second film; "AS" indicates a cohesive failure or adhesive split FM, with adhesive found on both films; "CDL" indicates complete delamination, wherein bond strength not measurable; and "NM" indicates a value was not measured.

F. Results

As shown in Table 4, CS 10-11 each includes an adhesive layer formed from (A) an NCO Component (MOR-FREE C-33) and (B) a polyol component (MOR-FREE L82-105 and CS PC 5, respectively) that lacks a PE-A PC. The laminate structures of CS 10 and CS 11 that have the Structures (VI) and (VI) (i.e., that contain the PET film) and are cured at 25° C. and 50% relative humidity (RH) each exhibits a bond strength after the boil-in-bag test of less than 3.5 N/2.54 cm. Thus, CS 10 and CS 11 each exhibits insufficient bond strength after the boil-in-bag test.

As shown in Table 4, Ex 1-9 each includes an adhesive layer formed from (A) an NCO Component (MOR-FREE C-33) and (B) a polyol component (PC 1, PC 3, PC 4, PC 8, PC 9, PC 10, PC 11, PC 12, and PC 13, respectively) containing a PE-A PC. The laminate structures of Ex 1-9 that have the Structures (VI) and (VI) (i.e., that contain the PET film) and are cured at 25° C. and 50% RH each exhibits a bond strength after the boil-in-bag test of greater than 3.5 N/2.54 cm. Thus, Ex 1-9 each exhibits sufficient bond strength after the boil-in-bag test.

TABLE 4

| | Ex 1 | Ex 2 | Ex 3 | Ex 4 | Ex 5 | Ex 6 | Ex 7 | Ex 8 | Ex 9 | CS 10 | CS 11 |
|---|---|---|---|---|---|---|---|---|---|---|---|
| | | | | | 25° C. Curing Temperature | | | | | | |
| | | | | | Adhesive Composition (grams) | | | | | | |
| MOR-FREE C-33 | 47.0 | 64.7 | 62.8 | 56.0 | 57.0 | 63.5 | 55.0 | 60.0 | 54.0 | 100 | 64.3 |
| MOR-FREE L82-105 | 63.4 | — | — | — | — | — | — | — | — | 60 | — |
| Ex PC 1 | — | 85.4 | — | — | — | — | — | — | — | — | — |
| Ex PC 3 | — | — | 89.3 | — | — | — | — | — | — | — | — |
| Ex PC 4 | — | — | — | 94.5 | — | — | — | — | — | — | — |
| CS PC 5 | — | — | — | — | — | — | — | — | — | — | 85.7 |
| Ex PC 8 | — | — | — | — | 93.7 | — | — | — | — | — | — |
| Ex PC 9 | — | — | — | — | — | 86.7 | — | — | — | — | — |
| Ex PC 10 | — | — | — | — | — | — | 95.6 | — | — | — | — |
| Ex PC 11 | — | — | — | — | — | — | — | 90.2 | — | — | — |
| Ex PC 12 | — | — | — | — | — | — | — | — | 98.1 | — | — |
| Ex PC 13 | — | — | — | — | — | — | — | — | — | — | — |
| Isocyanate:Polyol Mixing Ratio | 100:135 | 100:132 | 100:147 | 100:170 | 100:166 | 100:136 | 100:175 | 100:151 | 100:189 | 100:60 | 100:133 |
| | | | | Prelam/Adhesive Layer/LDPE Laminate Bond Strength (BS) (N/2.54 cm) | | | | | | | |
| BS after 2 days | 1.68$^{AS}$ | 2.37$^{AS}$ | 1.66$^{AS}$ | 3.43$^{AS}$ | 3.44$^{AS}$ | 4.37$^{AS}$ | 4.52$^{AS}$ | 3.23$^{AS}$ | NM | 2.81$^{AT}$ | 2.01$^{AS}$ |
| BS after 4 days | 2.50$^{AT}$ | 4.57$^{AT}$ | 3.08$^{AT}$ | 3.44$^{AT}$ | 3.93$^{AT}$ | 5.94$^{AT}$ | 4.45$^{AT}$ | 4.12$^{AT}$ | NM | 2.74$^{AT}$ | 2.30$^{AT}$ |
| BS after 7 days | 2.65$^{AT}$ | 3.72$^{AT}$ | 2.73$^{AT}$ | 3.21$^{AT}$ | 3.34$^{AT}$ | 4.18$^{AT}$ | 3.25$^{AT}$ | 3.13$^{AT}$ | NM | 2.64$^{AT}$ | 2.75$^{AT}$ |
| BS after 14 days | 2.53$^{AT}$ | 3.98$^{AT}$ | 3.10$^{AT}$ | 3.13$^{AT}$ | 3.57$^{AT}$ | 3.98$^{AT}$ | 2.93$^{AT}$ | 2.99$^{AT}$ | NM | 2.53$^{AT}$ | 2.44$^{AT}$ |
| BS Boil-in-Bag | 2.62$^{AT}$ | 3.07$^{AT}$ | 1.69$^{AT}$ | 2.19$^{AT}$ | 2.39$^{AT}$ | 2.72$^{AT}$ | 2.16$^{AT}$ | 2.06$^{AT}$ | NM | 0.79$^{AT}$ | 0.98$^{AT}$ |
| | | | | Prelam/Adhesive Layer/Cast Polypropylene Laminate Bond Strength (BS) (N/2.54 cm) | | | | | | | |
| BS after 2 days | 0.03$^{AS}$ | 1.06$^{AS}$ | 0.08$^{AS}$ | 5.26$^{AS}$ | 5.22$^{AS}$ | 5.39$^{AS}$ | 4.85$^{AS}$ | 4.67$^{AS}$ | 4.55$^{AS}$ | 3.53$^{AS}$ | 0.63$^{AS}$ |
| BS after 4 days | 2.03$^{AT}$ | 6.25$^{AT}$ | 4.35$^{AT}$ | 5.33$^{AT}$ | 5.61$^{AT}$ | 6.28$^{AT}$ | 5.44$^{AT}$ | 5.36$^{AT}$ | 5.79$^{AT}$ | 4.06$^{AT}$ | 2.91$^{AT}$ |
| BS after 7 days | 2.54$^{AT}$ | 5.67$^{AT}$ | 3.49$^{AT}$ | 5.23$^{AT}$ | 5.30$^{AT}$ | 5.95$^{AT}$ | 4.78$^{AT}$ | 4.43$^{AT}$ | 3.69$^{AT}$ | 4.41$^{AT}$ | 3.26$^{AT}$ |
| BS after 14 days | 2.94$^{AT}$ | 5.95$^{AT}$ | 4.39$^{AT}$ | 5.28$^{AT}$ | 5.55$^{AT}$ | 5.74$^{AT}$ | 4.52$^{AT}$ | 4.29$^{AT}$ | 3.70$^{AT}$ | 4.68$^{AT}$ | 3.63$^{AT}$ |
| BS Boil-in-Bag | 0.82$^{AS}$ | 2.11$^{AT}$ | 0.99$^{AT}$ | 1.13$^{AT}$ | 1.16$^{AT}$ | 1.34$^{AT}$ | 1.13$^{AT}$ | 1.13$^{AT}$ | 1.00$^{AT}$ | 0.35$^{AS/DL}$ | 0.37$^{AS/DL}$ |
| BS Chemical Aging | 1.12$^{AS}$ | 1.78$^{AS}$ | 0.89$^{AS}$ | 1.06$^{AS}$ | 0.98$^{AS}$ | 1.10$^{AS}$ | 0.91$^{AS}$ | 1.09$^{AS}$ | 0.96$^{AS}$ | 0.90$^{AS}$ | 0.82$^{AS}$ |
| | | | | PET/Adhesive Layer/LDPE Laminate Bond Strength (BS) (N/2.54 cm) | | | | | | | |
| BS after 2 days | 2.71$^{AS}$ | 3.75$^{AS}$ | 1.29$^{AS}$ | 3.80$^{AS}$ | 5.88$^{AS}$ | 9.15$^{FS/AS}$ | 5.55$^{AS}$ | 4.23$^{AS}$ | NM | NM | 1.86$^{AS}$ |
| BS after 4 days | 5.99$^{AS}$ | 10.81$^{FT}$ | 4.23$^{AS}$ | 6.87$^{AS/AT}$ | 9.89$^{FT}$ | 11.59$^{FS/FT}$ | 12.13$^{FT}$ | 6.58$^{AT}$ | NM | NM | 4.77$^{AS}$ |
| BS after 7 days | 6.27$^{AT/AS}$ | 11.13$^{FT}$ | 11.22$^{FT/AT}$ | 10.81$^{FT}$ | 10.95$^{FT}$ | 12.44$^{FT}$ | 10.17$^{FT}$ | 12.29$^{FT}$ | NM | NM | 7.18$^{AT}$ |
| BS after 14 days | 6.29$^{AT}$ | 12.94$^{FT}$ | 14.13$^{FT}$ | 11.25$^{FT}$ | 11.73$^{FT}$ | 12.37$^{FT}$ | 10.87$^{FT}$ | 12.07$^{FT}$ | NM | NM | 7.20$^{AT}$ |
| BS Boil-in-Bag | 4.51$^{AT}$ | 4.34$^{AT}$ | 4.03$^{AT}$ | 3.98$^{AT}$ | 3.99$^{AT}$ | 4.41$^{AT}$ | 4.09$^{AT}$ | 3.99$^{AT}$ | NM | NM | 2.38$^{AS}$ |
| BS Chemical Aging | 5.61$^{AS}$ | 5.63$^{AS}$ | 2.93$^{AS}$ | 4.76$^{AS}$ | 4.92$^{AS}$ | 4.45$^{AS}$ | 4.57$^{AS}$ | 4.29$^{AS}$ | NM | NM | 2.09$^{AS}$ |
| | | | | PET/Adhesive Layer/Cast Polypropylene Laminate Bond Strength (BS) (N/2.54 cm) | | | | | | | |
| BS after 2 days | 0.15$^{AS}$ | 1.24$^{AS}$ | 0.07$^{AS}$ | NM | NM | NM | NM | NM | NM | NM | 0.16$^{AS}$ |
| BS after 4 days | 5.22$^{AT}$ | 11.20$^{AT}$ | 6.31$^{AT}$ | NM | NM | NM | NM | NM | NM | NM | 2.39$^{AT}$ |
| BS after 7 days | 7.11$^{FT}$ | 15.54$^{FT}$ | 8.93$^{FT}$ | NM | NM | NM | NM | NM | NM | NM | 8.75$^{FT}$ |
| BS after 14 days | 7.05$^{FT}$ | 14.01$^{FT}$ | 8.44$^{FT}$ | NM | NM | NM | NM | NM | NM | NM | 9.96$^{FT}$ |
| BS Boil-in-Bag | 4.39$^{AT}$ | 5.25$^{AT}$ | 5.44$^{AT}$ | NM | NM | NM | NM | NM | NM | NM | 3.27$^{AT}$ |
| BS Chemical Aging | 8.26$^{AT}$ | 9.33$^{FT/AT}$ | 7.94$^{FT}$ | NM | NM | NM | NM | NM | NM | NM | 5.36$^{FT/AT}$ |

TABLE 5

| | Ex 12 | Ex 13 | CS 14 | CS 15 | CS 16 |
|---|---|---|---|---|---|
| 45° C. Curing Temperature | | | | | |
| Adhesive Composition (grams) | | | | | |
| MOR-FREE C-33 | 63.5 | 64.7 | 100 | 65.5 | 66.6 |
| MOR-FREE 1390A | — | — | 100 | — | — |
| Ex PC 2 | 86.8 | — | — | — | — |
| Ex PC 4 | — | 85.4 | — | — | — |
| CS PC 7 | — | — | — | 84.3 | — |
| CS PC 9 | — | — | — | — | 83.4 |
| Isocyanate:Polyol Mixing Ratio | 100:137 | 100:132 | 100:100 | 10:129 | 100:125 |
| Prelam/Adhesive Layer/LDPE Laminate Bond Strength (BS) (N/2.54 cm) | | | | | |
| BS after 1 day | $4.34^{AT}$ | $3.59^{AT}$ | $2.87^{AT}$ | $3.08^{AT}$ | $3.65^{AT}$ |
| BS after 7 days | $5.62^{AT}$ | $4.86^{AT}$ | $4.04^{AT}$ | $3.54^{AT}$ | $3.33^{AT}$ |
| BS after 14 days | $3.52^{AT}$ | $3.28^{AT}$ | $2.92^{AT}$ | $3.09^{AT}$ | $3.24^{AT}$ |
| BS Boil-in-Bag | $5.17^{AT}$ | $4.89^{AT}$ | $1.99^{AT}$ | $1.59^{AT}$ | $1.99^{AT}$ |
| BS Chemical Aging | $0.19^{AS/DL}$ | $0.35^{AS/DL}$ | $0.28^{AS/DL}$ | $0.18^{AS/DL}$ | $0.22^{AS/DL}$ |
| Prelam/Adhesive Layer/Cast Polypropylene Laminate Bond Strength (BS) (N/2.54 cm) | | | | | |
| BS after 1 day | $8.00^{AT}$ | $7.58^{AT}$ | $6.04^{AT}$ | $6.47^{AT}$ | $6.96^{AT}$ |
| BS after 7 days | $10.12^{AT}$ | $9.73^{AT}$ | $7.44^{AT}$ | $7.00^{AT}$ | $7.52^{AT}$ |
| BS after 14 days | $7.42^{AT}$ | $6.86^{AT}$ | $4.63^{AT}$ | $6.10^{AT}$ | $7.34^{AT}$ |
| BS Boil-in-Bag | $1.45^{AT}$ | $4.64^{AT}$ | CDL | $1.44^{AT}$ | $1.60^{AT}$ |
| BS Chemical Aging | $0.92^{AS}$ | $0.91^{AS}$ | $0.25^{AS/DL}$ | $0.33^{AS/DL}$ | $0.37^{AS/DL}$ |
| PET/Adhesive Layer/LDPE Laminate Bond Strength (BS) (N/2.54 cm) | | | | | |
| BS after 1 day | $19.32^{FT}$ | $13.95^{FT}$ | $13.15^{FT}$ | $9.14^{FT}$ | $10.31^{FT}$ |
| BS after 7 days | $16.46^{FT}$ | $18.46^{FT}$ | $15.91^{FT}$ | $9.65^{FT}$ | $10.43^{FT}$ |
| BS after 14 days | $14.35^{FT}$ | $11.44^{FT}$ | $15.11^{FT}$ | $10.20^{FT}$ | $9.98^{FT}$ |
| BS Boil-in-Bag | $8.62^{FT/AS}$ | $4.67^{AT}$ | $3.12^{AS}$ | $1.48^{AT}$ | $1.41^{AT}$ |
| BS Chemical Aging | $3.11^{AT}$ | $4.60^{AT}$ | $3.65^{AS}$ | $0.83^{AT}$ | $0.89^{AS}$ |
| PET/Adhesive Layer/Cast Polypropylene Laminate Bond Strength (BS) (N/2.54 cm) | | | | | |
| BS after 1 day | $12.99^{FT}$ | $9.01^{FT}$ | $12.63^{FT}$ | $11.64^{FT}$ | $13.66^{FT}$ |
| BS after 7 days | $10.90^{FT}$ | $11.98^{FT}$ | $10.02^{FT}$ | $10.89^{FT}$ | $12.66^{FT}$ |
| BS after 14 days | $12.27^{FT}$ | $17.71^{FT}$ | $12.53^{FT}$ | $9.66^{FT}$ | $12.47^{FT}$ |
| BS Boil-in-Bag | $8.81^{FT}$ | $8.37^{FT}$ | $7.98^{FT}$ | $3.44^{AT}$ | $4.66^{AT}$ |
| BS Chemical Aging | $7.70^{FT}$ | $8.64^{FT}$ | $7.95^{FT}$ | $1.54^{AT}$ | $1.56^{AT}$ |

As shown in Table 5, CS 14-16 each includes an adhesive layer formed from (A) an NCO Component (MOR-FREE C-33) and (B) a polyol component (MOR-FREE 1390A, CS PC 6, and CS PC 7, respectively) that lacks a PE-A PC. The laminate structures of CS 14-16 that have the Structure (V) (i.e., Prelam/Adhesive Composition/Cast Polypropylene) and are cured at 45° C. in an isotherm oven at a RH of 30% each exhibits a bond strength after the chemical aging of less than 0.5 N/2.54 cm. Thus, CS 14-16 each exhibits insufficient bond strength after chemical aging.

A shown in Table 5, Ex 12-13 each includes an adhesive layer formed from (A) an NCO Component (MOR-FREE C-33) and (B) a polyol component (PC 2 and PC 3, respectively) containing a PE-A PC. The laminate structures of Ex 12-13 that have the Structure (V) (i.e., Prelam/Adhesive Composition/Cast Polypropylene) and are cured at 45° C. in an isotherm oven at a RH of 30% each exhibits a bond strength after the chemical aging of greater than 0.50 N/2.54 cm. Thus, Ex 12-13 each exhibits sufficient bond strength after chemical aging.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A two-component solvent-less adhesive composition comprising the reaction product of:
   (A) an isocyanate component; and
   (B) a polyol component comprising a polyester-amide polycarbonate polyol.

2. The two-component solvent-less adhesive composition of claim 1, wherein the polyol component further comprises a phosphate-terminated polyol.

3. The two-component solvent-less adhesive composition of claim 1, wherein the polyester-amide polycarbonate polyol has a number average molecular weight (Mn) from 500 g/mol to 8,000 g/mol.

4. The two-component solvent-less adhesive composition of claim 1, wherein the polyester-amide polycarbonate polyol comprises less than 55 wt % species having a weight average molecular weight (Mw) less than 500 g/mol.

5. The two-component solvent-less adhesive composition of claim 2, wherein the polyol component comprises from 0.5 wt % to 35 wt % phosphate-terminated polyol, based on the total weight of the polyol component.

6. The two-component solvent-less adhesive composition of claim 1, wherein the isocyanate component is an aliphatic isocyanate prepolymer.

7. The two-component solvent-less adhesive composition of claim 2, wherein the phosphate-terminated polyol has the Structure (C)

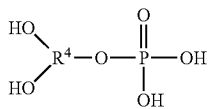

Structure (C)

wherein $R^4$ is selected from the group consisting of an ether group and a substituted ether group.

8. A laminate comprising
a first substrate;
a second substrate; and
an adhesive layer between the first substrate and the second substrate, the adhesive layer formed from the two-component solvent-less adhesive composition of claim 1.

9. The laminate of claim 8, wherein the first substrate is a metal foil film and the second substrate is a polypropylene film; and the laminate has a bond strength after chemical aging from 0.50 N/2.54 cm to 5.0 N/2.54 cm.

10. The laminate of claim 8, wherein the first substrate is a polyethylene terephthalate film; and the laminate has a bond strength after the boil-in-bag test from 3.5 N/2.54 cm to 10.0 N/2.54 cm.

11. A method of forming a two-component solvent-less adhesive composition comprising:
(A) providing a polyol component comprising a polyester-amide polycarbonate polyol;
(B) providing an isocyanate component; and
(C) reacting the polyol component with the isocyanate component to form the two-component solvent-less adhesive composition.

12. The method of claim 11 comprising providing the polyol component comprising
(i) the polyester-amide polycarbonate polyol; and
(ii) a phosphate-terminated polyol.

* * * * *